(12) United States Patent
Ameres et al.

(10) Patent No.: US 7,409,099 B1
(45) Date of Patent: Aug. 5, 2008

(54) METHOD OF IMPROVED IMAGE/VIDEO COMPRESSION VIA DATA RE-ORDERING

(75) Inventors: Eric Ameres, Cohoes, NY (US); James Bankoski, Wynantskill, NY (US); Adrian Grange, Cambridge (GB); Paul Wilkins, Cambridge (GB); Yaowu Xu, Clifton Park, NY (US)

(73) Assignee: On2 Technologies, Inc., Tarrytown, NY (US)

( * ) Notice: Subject to any disclaimer, the term of this patent is extended or adjusted under 35 U.S.C. 154(b) by 0 days.

(21) Appl. No.: 11/780,174

(22) Filed: Jul. 19, 2007

Related U.S. Application Data

(63) Continuation of application No. 10/915,149, filed on Aug. 10, 2004.

(51) Int. Cl.
*G06K 9/36* (2006.01)
*G06K 9/46* (2006.01)
(52) U.S. Cl. .................. 382/239; 382/232; 382/248
(58) Field of Classification Search .................. None
See application file for complete search history.

(56) References Cited

U.S. PATENT DOCUMENTS

| | | | |
|---|---|---|---|
| 5,091,782 A * | 2/1992 | Krause et al. ............ 348/400.1 |
| 5,341,440 A | 8/1994 | Earl et al. |
| 5,737,020 A * | 4/1998 | Hall et al. ................. 375/240.2 |
| 6,115,501 A * | 9/2000 | Chun et al. .................. 382/250 |
| 6,522,784 B1 * | 2/2003 | Zlotnick ...................... 382/245 |
| 6,934,419 B2 * | 8/2005 | Zlotnick ...................... 382/245 |
| 2002/0168114 A1 * | 11/2002 | Valente ........................ 382/250 |

OTHER PUBLICATIONS

Shape-adaptive DCT for generic coding of video Sikora, T.; Makai, B.; Circuits and Systems for Video Technology, IEEE Transactions on vol. 5, Issue 1, Feb. 1995 p. 59-62.*

* cited by examiner

*Primary Examiner*—Bhavesh Mehta
*Assistant Examiner*—Sean Motsinger
(74) *Attorney, Agent, or Firm*—Levisohn Berger LLP

(57) ABSTRACT

A method of image and video compression including data re-ordering to improve the performance of the core compression algorithm. In the inventive method, pixel values of at least part of an image are examined and then re-ordered into a new order that has greater compactability than the original pixel order. The re-ordered pixel values are then compressed, e.g., by block transform. In the particular case of a compression scheme employing a block transform, the inventive method reduces the complexity of the transform coefficients, resulting in more efficient compression. The method may be added to existing compression algorithms with only minor modifications to the bitstream and decoder architecture.

14 Claims, 13 Drawing Sheets

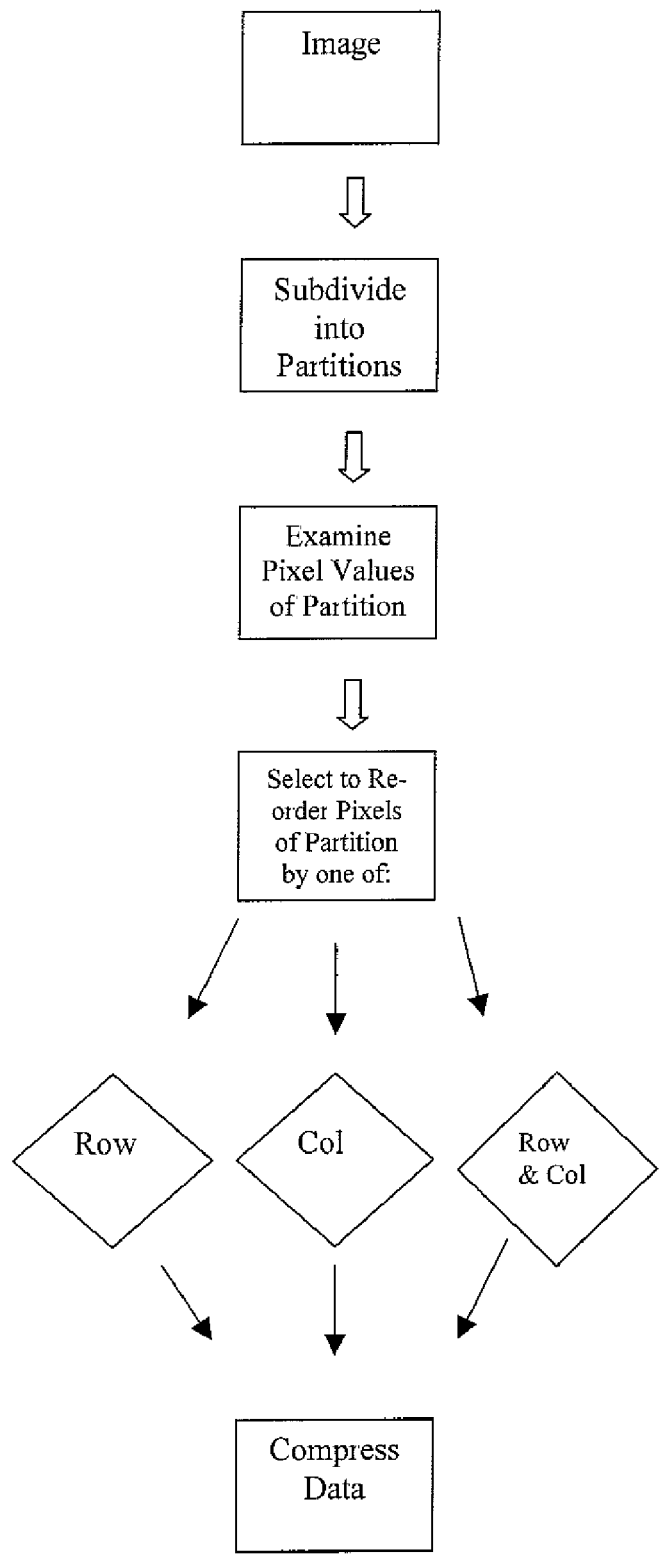

METHOD OF IMPROVED IMAGE/VIDEO COMPRESSION VIA DATA RE-ORDERING

RELATED APPLICATIONS

This is a continuation of application Ser. No. 10/915,149 filed on Aug. 10, 2004 and is now pending.

BACKGROUND OF THE INVENTION

1. Field of the Invention

The current invention relates to the fields of digital image and video compression. It further relates to the use of a novel data re-ordering scheme to improve the performance of the compression process.

2. Description of Related Art

Digital pictorial information, whether derived from an analogue source by a process of digitization or directly from a digital device, consists of huge volumes of data. As the ability of devices to capture higher resolution images improves so too does the amount of data required for their digital representation. If stored in raw format a single image may well require tens of mega-bytes of disk space.

The problem is further exacerbated when considering digital video data, especially for high definition video. A two-hour movie when stored in raw form at the highest resolution ATSC frame size (1920×1080 pixels at 30 frames per second) requires almost 641 Gbyte of disk space. At a data rate of almost 89 Mbyte/s the bandwidth required for transmission goes way beyond what is currently available.

Image compression may be thought of as a special case of video compression where an image is considered to be a video sequence consisting of a single frame.

The encoding operation may be considered to be a three-stage process. First, a block predictor, created from data already available to the decoder, is subtracted from the original data to form a prediction error signal. Second, the prediction error is block transformed and quantized. Finally, the transform coefficients are entropy coded to form a binary bitstream that constitutes the compressed frame. the transform coefficients are entropy coded to form a binary bitstream that constitutes the compressed frame.

The prediction stage may involve spatial or temporal prediction for video. For image compression, with no available temporal data, the only prediction mode available is spatial.

Many of the more successful algorithms have a two-dimensional block transform method at their core, partitioning each frame into rectangular blocks (usually 8×8 or 4×4) and applying the transform to each. Compression is achieved by coding the transform coefficients more efficiently than the original spatial data can be coded.

The premise of any compression algorithm employing a block transform is that greater coding efficiency is achieved by concentrating the signal energy into the smallest possible number of non-zero transform coefficients. A good transform and quantization strategy tends to ensure that it is the lower frequency coefficients that are non-zero, preserving structural form at the cost of losing textural detail. As the level of quantization increases the aim is to achieve a level of graceful degradation in the resulting image quality.

The Discrete Cosine Transform (DCT) has received the most attention over the last thirty years or so, being the transform of choice in all of the MPEG video compression and the original JPEG image compression International Standards.

From the human visual perception standpoint, the lower frequency components account for the major structural framework and it is in the corresponding low frequency coefficients where most of the signal energy is concentrated. Higher frequency components fill in textural detail and enhance sharpness, but in real world material account for a relatively small proportion of the signal energy.

Blocks that contain very little textural detail and no sharply defined edges will have comparatively little high frequency content resulting in smaller magnitude, and fewer, non-zero coefficients. This results in more efficient entropy coding.

SUMMARY OF THE INVENTION

The current invention is based on the premise that data within the frame may be re-arranged before the block transformation stage in a way that produces a more compact transform representation. This in turn results in fewer coded bits and therefore better compression. Any such re-ordering must be fully reversible at the decoder to enable the correct reconstruction block to be produced.

The current invention sub-divides the image into partitions of arbitrary size. A partition is defined as any sub-set of the pixel values in the image, may have arbitrary shape and may be formed from a set of pixels in the image that are not contiguous.

Where a block transform is employed, the boundaries of a partition do not have to align with transform block boundaries. The principle that reducing spatial variation improves compression performance it not limited to block transform based algorithms. Other compression techniques may also benefit from such data re-arrangement.

The current invention may be integrated into any image or video compression algorithm that involves a block transform.

For the purposes of the current invention the term image refers to a rectangular array that contains either raw pixel values or prediction error values. In a compression algorithm that has an inter coding mode, i.e. one in which a predictor is subtracted from the original raw pixel data, the term image refers to the prediction error image.

Before the block transform is applied, a process is carried out to sub-divide the image into a number of partitions. Within each partition, the spatial positions of the pixel values are re-arranged so as to reduce the overall spatial variation within the partition.

In one embodiment of the current invention, details of exactly how the data is re-arranged are parameterized and encoded as side information in the bitstream. A further embodiment requires no such side information, generating the required parameters from data already available at the decoder.

In the reconstruction loop at the encoder, at a point immediately after the encoded transform coefficients have been inverse transformed and inverse quantized, the pixel re-ordering is undone and the resulting reconstructed pixels are placed back into their original order.

At the decoder, the coefficients of the block transform are read from the bitstream, inverse transformed, and inverse quantized. The parameters of the re-arrangement are either read directly from the bitstream or generated based on data already available at the decoder. The data re-arrangement is undone to restore the prediction error signal to its correct spatial order.

In both the reconstruction loop of the encoder and the decoder the resulting prediction error block may be treated exactly as it would have been had the data re-arrangement not taken place. This usually means that it is added to the appropriately constructed prediction block and the result written into the reconstruction frame.

Many compression algorithms use the technique of Motion Compensation to generate a predictor for data in a particular frame by translating data from one or more previous frames. The resulting motion vector(s) may be specified to sub-pixel precision, requiring the application of interpolating filters to the pixel aligned data from the previous frame(s). In the current invention, these interpolation filters may optionally be applied to data from the previous frame(s) in re-arranged data order or to data in their original order.

In its broadest sense, the invention is a method of encoding digital image or video data having at least one frame. In the inventive method, pixel values of at least part of an image are examined, the pixel values having an original order. The examined pixel values are re-ordered into a new order that has greater compactability than the original pixel order. Finally, the re-ordered pixel values are compressed. Preferably, the image is sub-divided into a plurality of partitions, each partition having a plurality of pixels. These partitions may be of all the same size or of varying sizes. The partition size information may be parameterized and encoded into the bitstream or may be implicit in the data and not explicitly transmitted in the bitstream.

Preferably, re-ordering parameters are generated for indicating how the pixel values are re-ordered. One set of parameters may be provided for all partitions of a given image, or each partition may have its own independently specified set of rearrangement parameters.

The pixel values may be re-ordered by row, by column, or by a combination of row and column re-ordering.

BRIEF DESCRIPTION OF DRAWINGS

FIG. 2 is a listing of the progress of the row-order list as it is generated as each row is placed either at the top or at the bottom of the list in accordance with the invention.

FIG. 3 is a listing of the progress of the column-order list as it is generated as each row is placed either at the top or at the bottom of the list in accordance with the invention.

FIGS. 4-14 are respective block diagrams showing steps of encoding digital image or video data in accordance with embodiments of the invention.

DETAILED DESCRIPTION OF THE DRAWINGS AND THE PREFERRED EMBODIMENTS

Figure 1A:
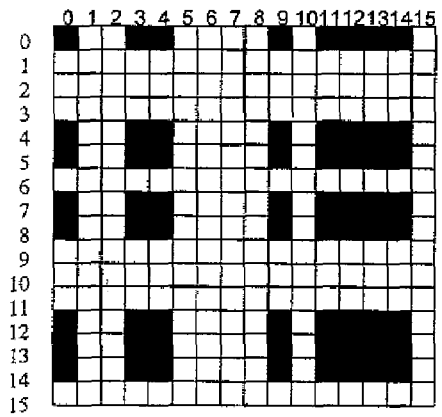
FIG. 1(a) is a schematic of a 16×16 macroblock.
Figure 1B:
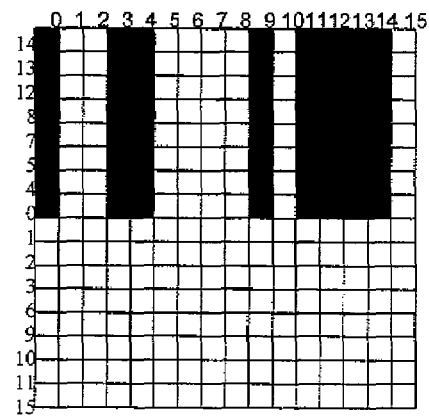
FIG. 1(b) is a schematic of the macroblock of FIG. 1(a) after row re-ordering in accordance with the invention.
Figure 1C:
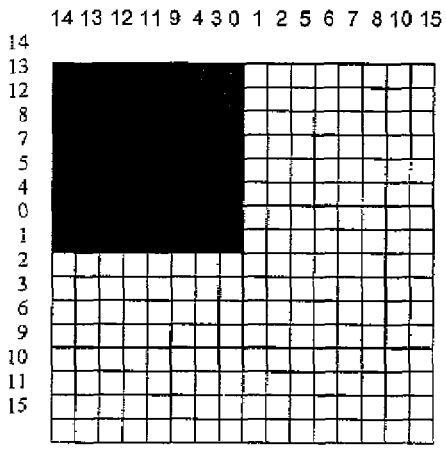
FIG. 1(c) is a schematic of the macroblock of FIG. 1(b) after column re-ordering in accordance with the invention.
Figures 2, 3:
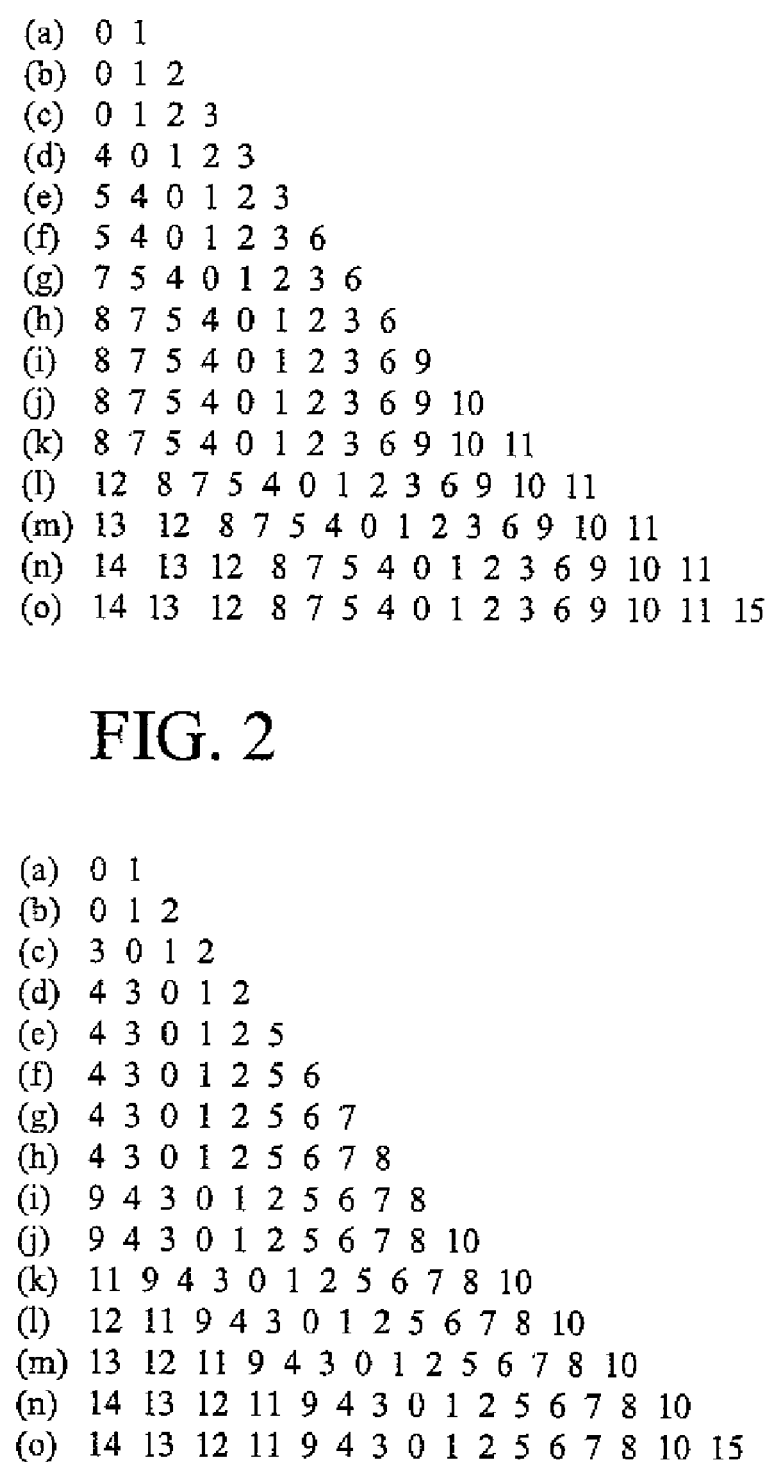

A description of the invention will now be given with reference to the attached FIGS. 1-3. It should be understood that these figures are exemplary in nature and in no way serve to limit the scope of the invention, which is defined by the claims appearing hereinbelow. In the preferred embodiment of the current invention a data re-arrangement procedure is defined for integration into any compression algorithm employing a block transform. One such transform would be the 8×8 DCT.

Each frame is coded as a set of contiguous, non-overlapping, rectangular blocks of size 8×8 pixels. In the case where the image data is in a YUV format the luma (Y) and the chroma (U & V) planes are each coded.

Furthermore, a set of six blocks is aggregated into a higher-level Macroblock structure well understood in the art. A macroblock is composed of the four blocks that form a 16×16 region in the luma plane and the co-located chroma blocks from each of the spatially sub-sampled chroma planes.

Whatever the data that is to be transformed represent, the re-arrangement process is carried out at some point after the prediction signal, if one exists, is created and before the transform is applied.

It should be noted that the size of the re-ordering partition is independent of the size of the block transform in the most general case. For example, even though an 8×8 transform is used data may be re-arranged within partitions of the following size (others are possible and may give benefit):

8×8 a single block,
8×16 two vertically adjacent blocks,
16×16 four neighboring blocks For example, for each macroblock in the frame the left and right 8×16 pixel luma partitions may be subjected to independent re-arrangement and the corresponding chroma blocks re-arranged at the 8×8 level. Alternatively, the four luma blocks may be re-arranged within a single 16×16 partition. At the expense of breaking the macroblock structure, one may also consider re-arranging within 8×16 partitions i the chroma planes also. In the event the data is to undergo a DCT transform, it is preferred that the partition width and height each be twice the size of the block being transformed. Thus, an 8×8 DCT block would be employed on a 16×16 partition.

Having decided on the partition size, it is necessary to determine exactly how to re-arrange the data.

The current invention defines two re-ordering operations: re-arrangement of the order of the rows within the block, and a re-arrangement of the order of the columns within the block. Neither, one, or both of these operations may be applied in a particular application scenario. If both operations are applied, the order of application is generally irrelevant.

In the most general case for an M×N partition, having M rows of N samples, there will be M!/2 different row orderings, reverse orderings being considered equivalent. Similarly there will be N!/2 column orderings and therefore M!N!/4 combined orderings. These numbers are prohibitively large even for relatively small partition sizes, so the current invention defines an algorithm for generating one of a sub-set of the total number of orderings that is more easily coded.

Without loss of generality, the algorithm for re-ordering the rows in the partition reduces the spatial variation thereof, and then it may be applied as a similar processor to re-order the columns. Furthermore, the algorithm may be specified for an arbitrary partition size of M×N.

To measure the local spatial variation within the partition for a particular data ordering a metric $V(R0,R1)$ is defined, where $R0$ and $R1$ are two rows or columns within the partition. The exact definition of $V(R0,R1)$ is implementation dependent. That is, each implementation could have a different function defined for determining variance. One embodiment entails using the sum-square-difference defined as follows:

$$V(R0,R1)=\text{SUM }((R0[i]-R1[i])*(R0[i]-R1[i])), 0 \leq i \leq N-1 \quad (1)$$

Another embodiment entails the use of the sum of absolute differences:

$$V(R0,R1)=\text{SUM }(ABS(R0[i]-R1[i])), 0<=i<=N-1 \quad (2)$$

Still another embodiment entails the use of a correlation of (1) and (2) above:

$$V(R0,R1)=N*SUM\ (R0[i]*R1[i])*SUM(R0[i])*SUM(R1[i]))/((N*SUM(R0[i]^2)-$$

$$(SUM(R0[i]))^2)*(N*SUM(R1[i]^2)-(SUM(R1[i]))^2)^{1/2}) \quad (3)$$

These examples are three of only a vast number of functions that provide a measure of similarity between two rows or columns.

The metric should measure the spatial variability within the partition, having a larger value for partitions that have greater spatial variability. The variability metric reflects the degree of spatial variation within the partition. By reducing the spatial variation in the partition it is expected that the transform will generate smaller high-frequency coefficients, and in particular more zero coefficients. The direct result of this is the reduction in the number of bits generated during entropy coding, and thus a decrease in the data rate.

With the variability metric defined, the row re-ordering process is defined as follows. For each partition (or for each image if the image is not partitioned), the rows and/or columns are examined. The first two rows/columns are put into the new order list as is. The third row/column is then compared to the first two rows/columns of the new order list. If it is determined that the third row/column is more like the first row/column, the third row/column is placed before the first row/column on the new order list. If the third row/column is more like the second row/column, the third row/column is placed after the second row/column on the new order list. Subsequent rows/columns are then preferably compared to the first and last rows/columns on the new order list.

It is preferred to place the third row before the first row (and thus to compare any given row to the ever-changing first and last rows/columns of the list) so as to avoid a discontinuity between the first and second rows/columns. This is because compression makes use of similarity between rows and columns to achieve more efficient data compaction. Hence, in the given example in the drawings, row 4 is compared to rows 0 and 3, since they are the first and last rows listed in line c) of FIG. 2. Subsequently, row 5 is compared to rows 4 and 3, since row 4 is the first row listed in line d) and row 3 is the last row listed in line d). A row or column's place in the order may be represented by an F written to the bitstream for the front of the list or an E written to the bitstream for the end of the list.

More specifically, each partition in turn undergoes the data re-arrangement process as follows:

1. Re-arrange the order of the rows in the MB as follows:
    a. Label the rows of the MB 0 to 15 (see FIG. 1*a*)
    b. Create an empty list to hold the evolving row ordering
    c. Put row labels 0 & 1 into the list in order (see FIG. 2*a*)
    d. For successive rows labelled 2 through 15:
        i) Compute $V_t$, the variance between this row and the row whose label appears at the top of the list
        ii) Compute $V_b$, the variance between this row and the row whose label appears at the bottom of the list
        iii) If $V_t<V_b$ insert the label of the current row at the top of the list, and record this decision by inserting a binary value 0 into the bitstream (see FIGS. 2*b-o*)
        iv) If $V_t^3 V_b$ insert the label of the current row at the bottom of the list, and record this decision by inserting a binary value 1 into the bitstream (see FIGS. 2*b-o*)
    e. Re-order the rows within the MB to match the order specified in the created list.

Figure 1D:
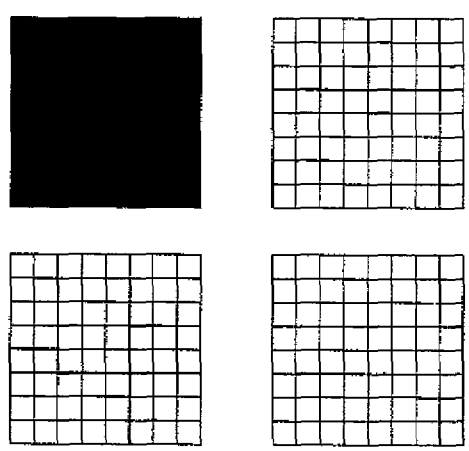
FIG. 1(d) is a schematic of the macroblock of FIG. 1(c) coded as four 8×8 blocks in accordance with the invention.
Figure 4:
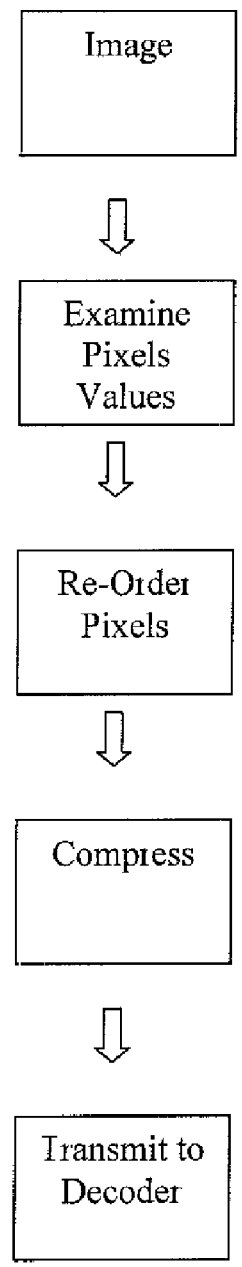
Figure 5:
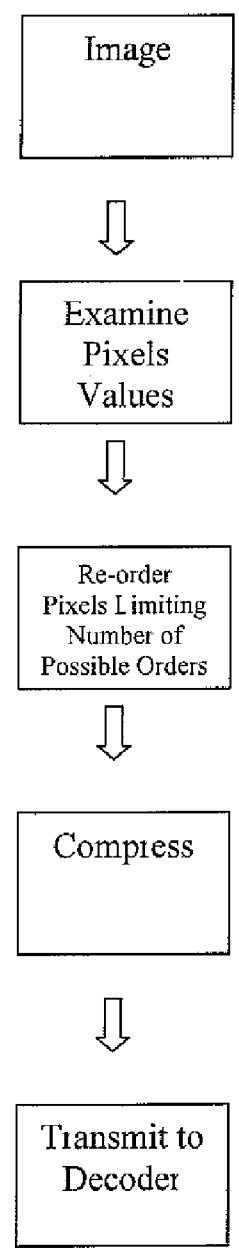
Figure 6:
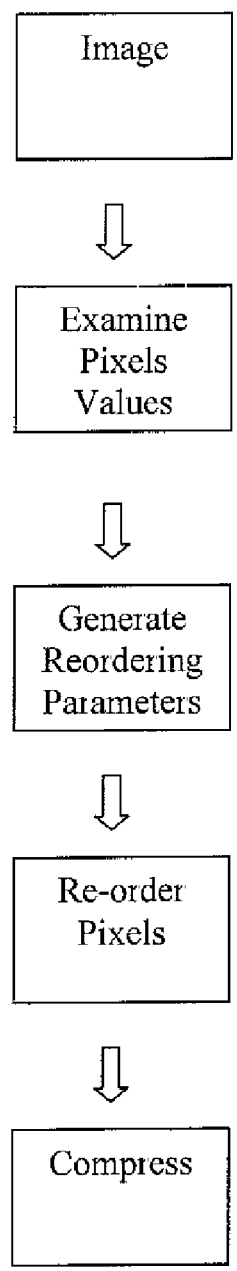
Figure 7:
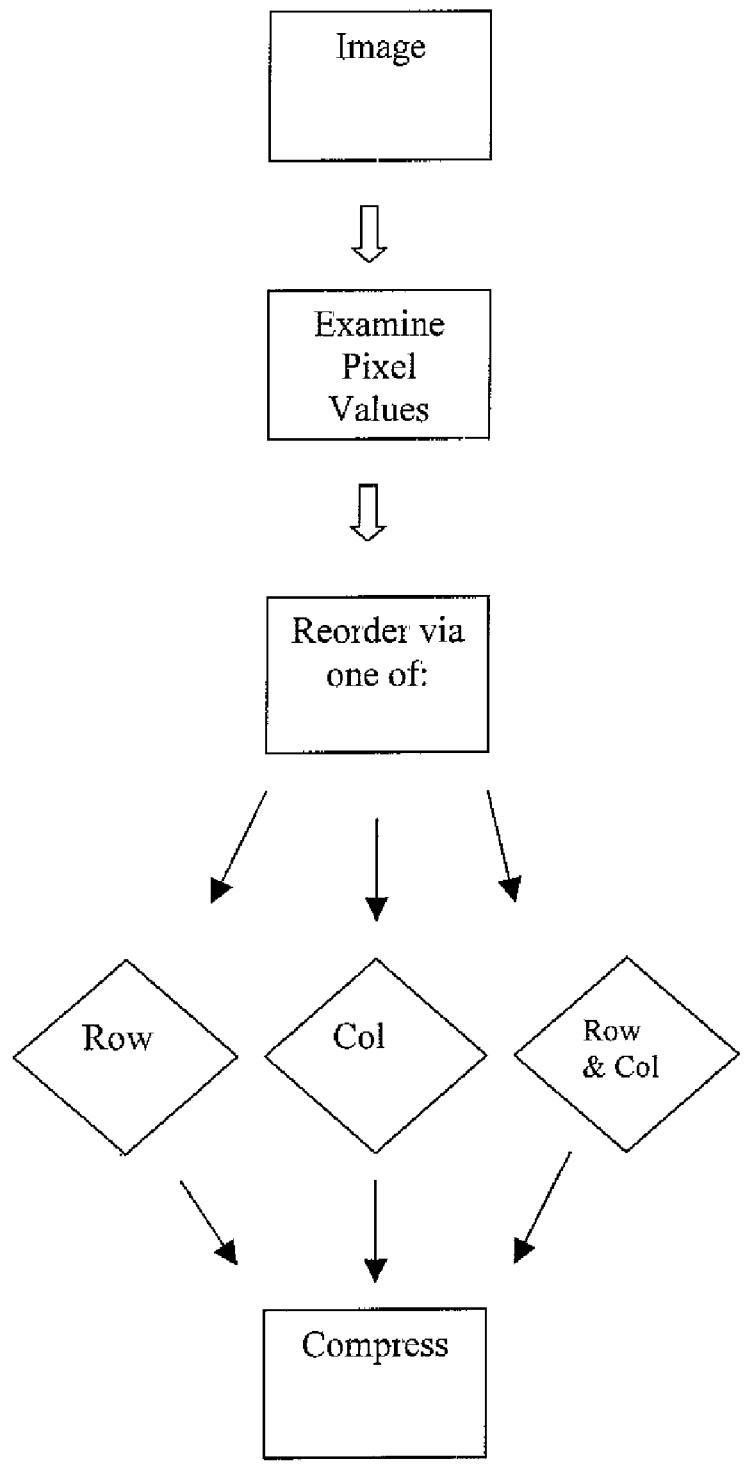
Figure 8:
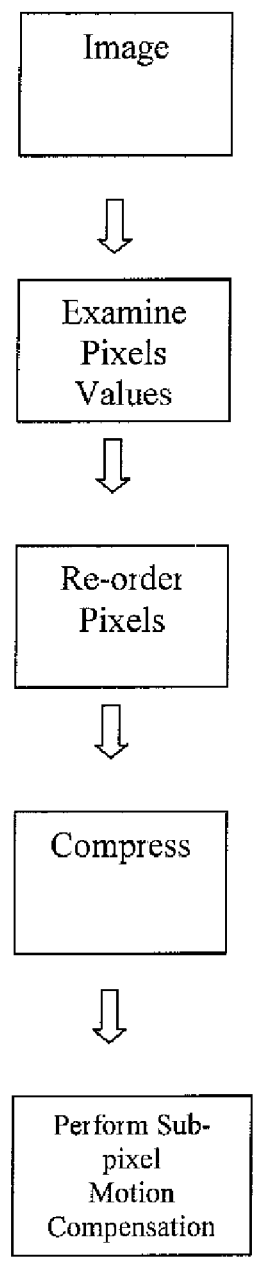
Figure 9:
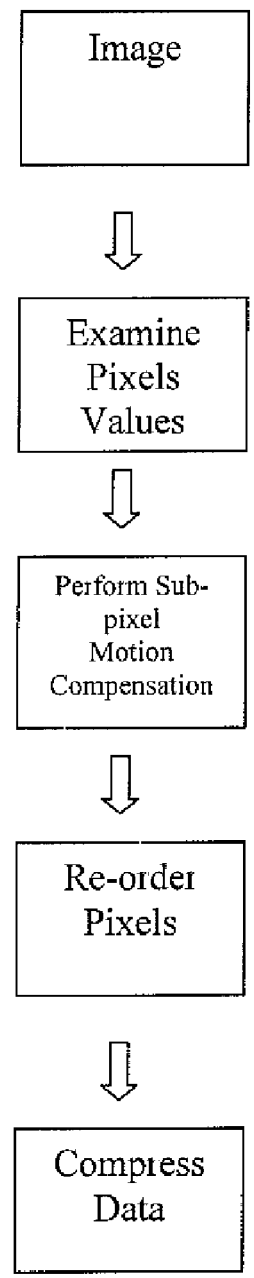
Figure 10:
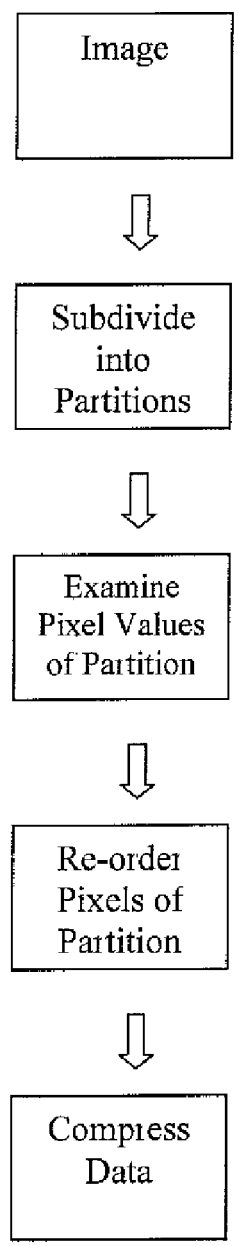
Figure 11:
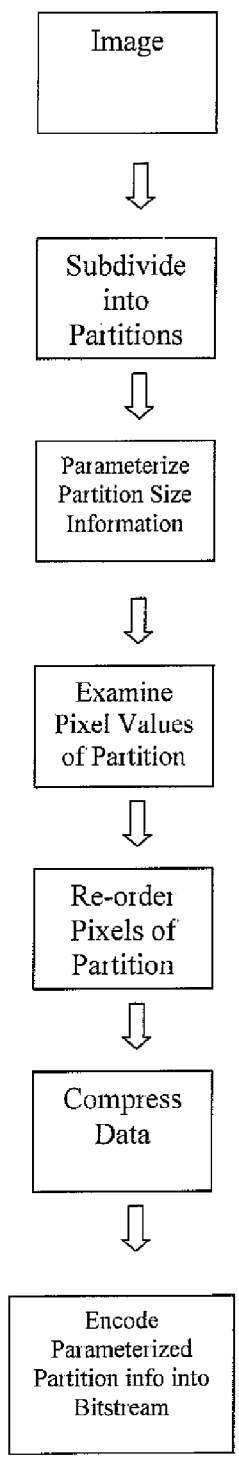
Figure 12:
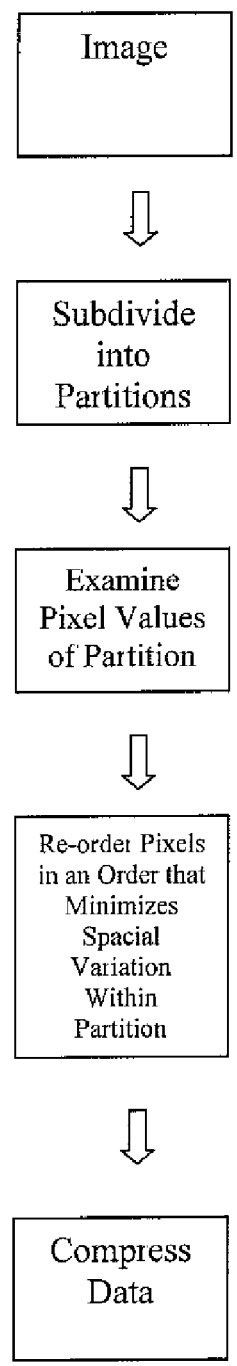
Figure 13:
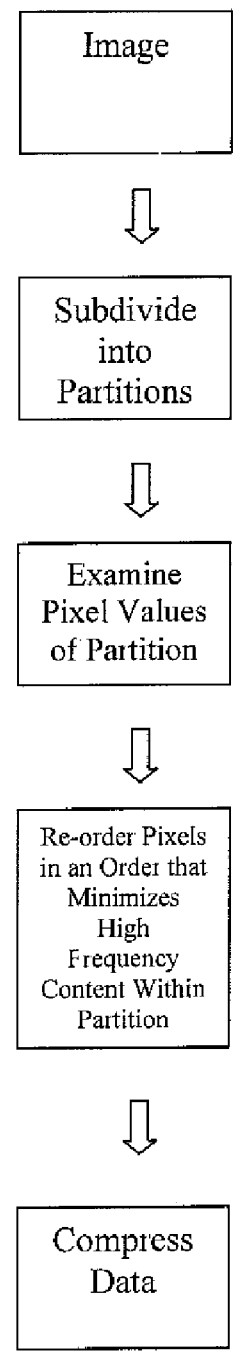

2. Re-arrange the order of the columns in the MB as follows:
    a. Label the columns of the MB 0 to 15 (see FIG. 1*a*)
    b. Create an empty list to hold the evolving column ordering
    c. Put column labels 0 & 1 into the list in order (see FIG. 2*a*)
    d. For successive columns labelled 2 through 15:
        i) Compute $V_t$, the variance between this column and the column whose label appears at the top of the list
        ii) Compute $V_b$, the variance between this column and the column whose label appears at the bottom of the list
        iii) If $V_t<V_b$ insert the label of the current column at the top of the list, and record this decision by inserting a binary value 0 into the bitstream (see FIGS. 2*b-o*)
        iv) If $V_t^3 V_b$ insert the label of the current column at the bottom of the list, and record this decision by inserting a binary value 1 into the bitstream (see FIGS. 2*b-o*)
    e. Re-order the columns within the MB to match the order specified in the created list In the preferred embodiment, the re-arranged MB is then broken up into four separate 8×8 blocks and transform coded—using the Discrete Cosine Transform (DCT), for example FIG. 1*d* shows the four blocks that result from the re-arrangement process for the example data shown in FIG. 1*a*.

For the example data each 8×8 block produces a single non-zero DCT coefficient at the DC position. By contrast, without data re-arrangement, each of the 8×8 blocks would produce several non-zero DCT coefficients due to the frequent sharp black-to-white transitions.

At the decoder the image is divided into an identical set of partitions to that used at the encoder and each partition is processed as follows:

1. Decode the transform coefficients from the bitstream for each of the four blocks in the MB.

2. Inverse transform and de-quantize the DCT coefficients for each of the four blocks in the MB (data will be in re-arranged order).

3. Re-arrange the order of the rows in the MB as follows:
    a. Label the rows of the MB 0 to 15 (see FIG. 1*a*)
    b. Read and decode the re-ordering parameters (e.g., the F's and E's written to the bitstream) from the bitstream, one binary value per row for rows labelled 2 through 15
    c. Let $D_i$ represent the decision bit for the $i^{th}$ row, 0 indication that the row should go at the top of the list, 1 indicating that it should go at the bottom of the list
    d. Create an empty list to hold the evolving row ordering
    e. Put row labels 0 & 1 into the list in order (see FIG. 2*a*)
    f. For successive rows labelled 2 through 15:
        i) If $D_i$ equals 0: insert the label of the current row at the top of the list (see FIGS. 2*b-o*)
        ii) If $D_i$ equals 1: insert the label of the current row at the bottom of the list (see FIGS. 2*b-o*)
    g. Re-order the rows within the MB from that specified in the created list back to the original order, i.e. 0 to 15

4. Re-arrange the order of the columns in the MB as follows:
    a. Label the columns of the MB 0 to 15 (see FIG. 1*a*)
    b. Read and decode the re-ordering parameters from the bitstream, one binary value per column for columns labelled 2 through 15
    c. Let $D_i$ represent the decision bit for the $i^{th}$ column, 0 indicating that the column should go at the top of the list, 1 indicating that it should go at the bottom of the list
    d. Create an empty list to hold the evolving column ordering e. Put column labels 0 & 1 into the list in order (see FIG. 2a)

f. For successive columns i, labelled 2 through 15:

i) If $D_i$ equals 0: insert the label of the current column at the top of the list (see FIGS. 2b-o)

ii) If $D_i$ equals 1: insert the label of the current column at the bottom of the list (see FIGS. 2b-o)

g. Re-order the columns within the MB from that specified in the created list back to the original order, i.e. 0 to 15

The new ordering must be encoded so that the re-ordering may be applied at the decoder. There will be $2^{(M-2)}$ possible orderings requiring M-2 bits to encode for a particular partition. This number may be reduced significantly using entropy coding methods and using context information such as the ordering selected for neighboring partitions.

In order to improve the performance of the entropy coding the algorithm for re-ordering may be adjusted to favor more frequent combinations. For example, thresholds could be used to ensure that less frequent row-orderings are only selected if there is a sufficiently large reduction in measured partition variability. For example, in the context of the preferred embodiment, one may introduce a bias against inserting the row at the tail of the list or against changing the point of insertion between rows. Another variant may bias towards using the same re-ordering as the re-ordering used in neighboring blocks.

A further variant would employ a vector quantization strategy for coding the chosen row order, where the most common set of orderings are chosen to form a codebook that may be initialized to a standard fixed codebook generated from a set of test data, and optionally updated dynamically throughout the frame or video clip.

A further variant of the preferred embodiment requires no side-information to be transmitted. Rather than working out the row re-ordering based on the original data in the encoder, the re-ordering is computed based on the prediction signal on the basis that the prediction error signal will be distributed with similar characteristics as the prediction signal itself. Since the prediction block is available at the decoder, no side information is required to be encoded, at the cost of computing the ordering at the decoder.

As another alternative, information concerning one frame, image, or partition may be utilized on behalf of subsequent frames, images, or partitions. For example, partition size information about a given partition may be utilized on subsequent partitions, and the new order created for a given image/frame may be used to influence the re-ordering for subsequent images/frames. A given frame may have a block of data in the same position as a subsequent frame. The given block was re-ordered when transmitted. The software implementer might choose to use this same reordering again unless the new algorithm provides a substantially different and better reordering. Thus, instead of transmitting F's and E's as new order parameters representing row and column placement, a much smaller amount of data need be transmitted that indicates that the same set of F's and E's as used in the last frame are valid for the current frame. The same logic applies to using the new order created for a given partition is used to influence the re-ordering for subsequent partitions; one can use the data from a nearby (e.g., to the left or above) previously encoded block for a subsequent block.

Having described the invention with respect to the above embodiments and drawings, it should be noted that the scope of the invention is not limited to the above description or that shown in the drawings but rather is defined by the claims appearing herein below and all such equivalents.

What is claimed is:

1. A method of encoding digital image or video data having at least one frame, comprising the steps of:
   a) examining pixel values of at least part of an image having an original order;
   b) re-ordering the examined pixel values into a new order that has greater compactability than the original pixel order said re-ordering comprising the steps of:
      i) labeling at least one of: the rows or the columns;
      ii) creating an empty list to hold the evolving new row or column order;
      iii) placing the first tow rows or columns labeled in said step i) in order in the new order list;
      iv) computing the variance between all subsequent rows or columns and the first two rows or columns of the new order list respectively; and
      v) determining if the variance between a given row or column and the first row or column on the new order list is smaller or larger than the variance between the given row or column and the last row or column on the new order list; and
   c) compressing the re-ordered pixel values.

2. The method of claim 1, further comprising the steps of: placing the given row or column closer to the first row or column on the new order list if the variance between the given row or column and the first row or column is smaller than the variance between the given row or column and the last row or column on the new order list; and
placing the given row or column closer to the last row or column on the new order list if the variance between the given row or column and the last row or column is smaller than the variance between the given row or column and the first row or column on the new order list.

3. The method of claim 1, further comprising the step of transmitting the compressed re-ordered data to a decoder.

4. The method of claim 1, further comprising the step of sub-dividing the image into a plurality of partitions, each partition having a plurality of pixels.

5. The method of claim 4, wherein partition size information is implicit and not explicitly transmitted in the bitstream.

6. The method of claim 4, further comprising the step of parameterizing partition size information and encoding said information into the bitstream.

7. The method of claim 1, further comprising the step of d) performing sub-pixel motion compensation on the pixel values.

8. The method of claim 7, wherein said step d) is performed before re-ordering step b).

9. The method of claim 7, wherein said step d) is performed after re-ordering step b).

10. The method of claim 6, further comprising the step of using partition size information about a given partition on subsequent partitions.

11. The method of claim 1, wherein the new order created for a given image is used to influence the re-ordering for subsequent images.

12. The method of claim 1, further comprising the step of limiting the number of possible new orders generated in step b) wherein said limiting step utilizes at least one of a fixed codebook of predetermined data orders and an adaptive codebook of predetermined data orders.

13. The method of claim 1, said compressing step c) further comprising the step of coding the re-arranged data via a block transform.

14. The method of claim 1, wherein the new order created for a given partition is used to influence the re-ordering for subsequent partitions.

* * * * *